United States Patent
Hutchison et al.

(10) Patent No.: US 12,109,657 B2
(45) Date of Patent: Oct. 8, 2024

(54) SYSTEMS AND METHODS FOR CONTROLLING DRIVE ROLL CONTACT FORCE IN WELDING-TYPE SYSTEMS

(71) Applicant: Illinois Tool Works Inc., Glenview, IL (US)

(72) Inventors: Richard M. Hutchison, Iola, WI (US); Todd Gerald Batzler, Hortonville, WI (US); Dennis Roland Sigl, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/736,516

(22) Filed: Jan. 7, 2020

(65) Prior Publication Data

US 2020/0238421 A1  Jul. 30, 2020

Related U.S. Application Data

(60) Provisional application No. 62/798,598, filed on Jan. 30, 2019.

(51) Int. Cl.
*B23K 9/12*   (2006.01)
*B23K 9/095*  (2006.01)
*B23K 9/133*  (2006.01)

(52) U.S. Cl.
CPC ............ *B23K 9/125* (2013.01); *B23K 9/0956* (2013.01); *B23K 9/1333* (2013.01); *B23K 9/1336* (2013.01)

(58) Field of Classification Search
CPC .... B23K 9/125; B23K 9/1333; B23K 9/0956; B23K 9/1336
See application file for complete search history.

(56) References Cited

U.S. PATENT DOCUMENTS

| 2,788,463 A | * | 4/1957 | Kennedy | B23K 9/125 314/78 |
| 5,521,355 A | | 5/1996 | Lorentzen | |

(Continued)

FOREIGN PATENT DOCUMENTS

| CN | 1964814 | 5/2007 |
| CN | 104010756 | 8/2014 |
| CN | 206382683 | 8/2017 |

OTHER PUBLICATIONS

1 Canadian Office Action Appln. No. 3,068,020 dated Mar. 31, 2021.

(Continued)

*Primary Examiner* — Brian W Jennison
(74) *Attorney, Agent, or Firm* — McAndrews, Held & Malloy, Ltd.

(57) ABSTRACT

Disclosed welding-type systems and methods are directed to employing a wire feeder for feeding an electrode wire from a wire source in a welding system. The wire feeder includes one or more drive rolls to advance the electrode wire by contact force. In disclosed examples, a contact force on the wire from the drive rolls is adjustable. In some examples, the system includes a controller to receive a feedback signal corresponding to the contact force. The controller commands an actuator or other mechanism to adjust the contact force on the wire, such as by adjusting a position of the one or more drive rolls in response to the contact force falling outside a range of threshold contact force values.

17 Claims, 6 Drawing Sheets

(56) References Cited

U.S. PATENT DOCUMENTS

| | | | |
|---|---|---|---|
| 2005/0189335 A1* | 9/2005 | Huismann | B23K 9/073 |
| | | | 219/137.71 |
| 2013/0253728 A1 | 9/2013 | Stumpfl | |
| 2014/0027429 A1* | 1/2014 | Chantry | B23K 9/173 |
| | | | 219/137.7 |
| 2014/0263533 A1* | 9/2014 | Enyedy | B23K 9/173 |
| | | | 226/188 |
| 2017/0136567 A1* | 5/2017 | Lahti | B23K 9/125 |
| 2017/0165779 A1* | 6/2017 | Barhorst | B23K 9/095 |
| 2017/0189982 A1* | 7/2017 | Hsu | B65H 51/18 |
| 2018/0221981 A1 | 8/2018 | Garvey | |

OTHER PUBLICATIONS

European Office Communication Appln No. 20153797.4 dated Apr. 18, 2023.

* cited by examiner

SYSTEMS AND METHODS FOR CONTROLLING DRIVE ROLL CONTACT FORCE IN WELDING-TYPE SYSTEMS

CROSS REFERENCE TO RELATED APPLICATIONS

This application is a Non-Provisional Patent Application of U.S. Provisional Patent Application No. 62/798,598 entitled "Systems and Methods for Controlling Drive Roll Contact Force in Welding-Type Systems" filed Jan. 30, 2019, which is herein incorporated by reference in its entirety.

BACKGROUND

Welding is a process that has become ubiquitous in all industries. Conventional systems and methods for short circuit welding processes, such as welding, brazing, adhesive bonding, and/or other joining operations, require substantial investments in equipment, such as processing, displays, practice workpieces, welding tool(s), sensor(s), and/or other equipment.

Conventional short circuit gas metal arc welding (GMAW), also referred to as metal inert gas (MIG) welding, is a welding process in which an electric arc forms between an electrode and pieces of metal that are to be welded. The electric arc generates heat that causes the pieces of metal to melt. Upon cooling down of the melted pieces of metal, the pieces of metal join and form a weld. Electrical and/or physical parameters can be measured and the results of these measurements may be provided to the welder and/or to a control system and control circuit as process and system feedback during the welding operation. The welder and/or the control system and the control circuit may use this feedback information to adjust the welding parameters in real time while welding thus causing in an improvement in the welding process.

In such systems, the electrode is advanced to the pieces of metal by a wire feeder. For instance, drive rolls can create tension on the electrode to drive the wire forward. However, continuous use of the drive rolls can cause the surface of the drive roll to wear, which can cause slippage, deformation of the wire, splintering, or other issues. Thus, systems and methods to address the degradation of drive rolls is desired.

SUMMARY

The present disclosure is directed to systems and methods employing a wire feeder for feeding an electrode wire from a wire source in a welding system. The wire feeder includes one or more drive rolls to advance the electrode wire by contact force. In disclosed examples, a contact force on the wire from the drive rolls is adjustable. In some examples, the system includes a controller to receive a feedback signal corresponding to the contact force. The controller commands an actuator or other mechanism to adjust the contact force on the wire, such as by adjusting a position of the one or more drive rolls in response to the contact force falling outside a range of threshold contact force values.

These and other advantages, aspects and novel features of the present disclosure, as well as details of an illustrated example thereof, will be more fully understood from the following description and drawings.

DRAWINGS

The figures are not necessarily to scale. Where appropriate, similar or identical reference numbers are used to refer to similar or identical components.

DETAILED DESCRIPTION

Figure 1:
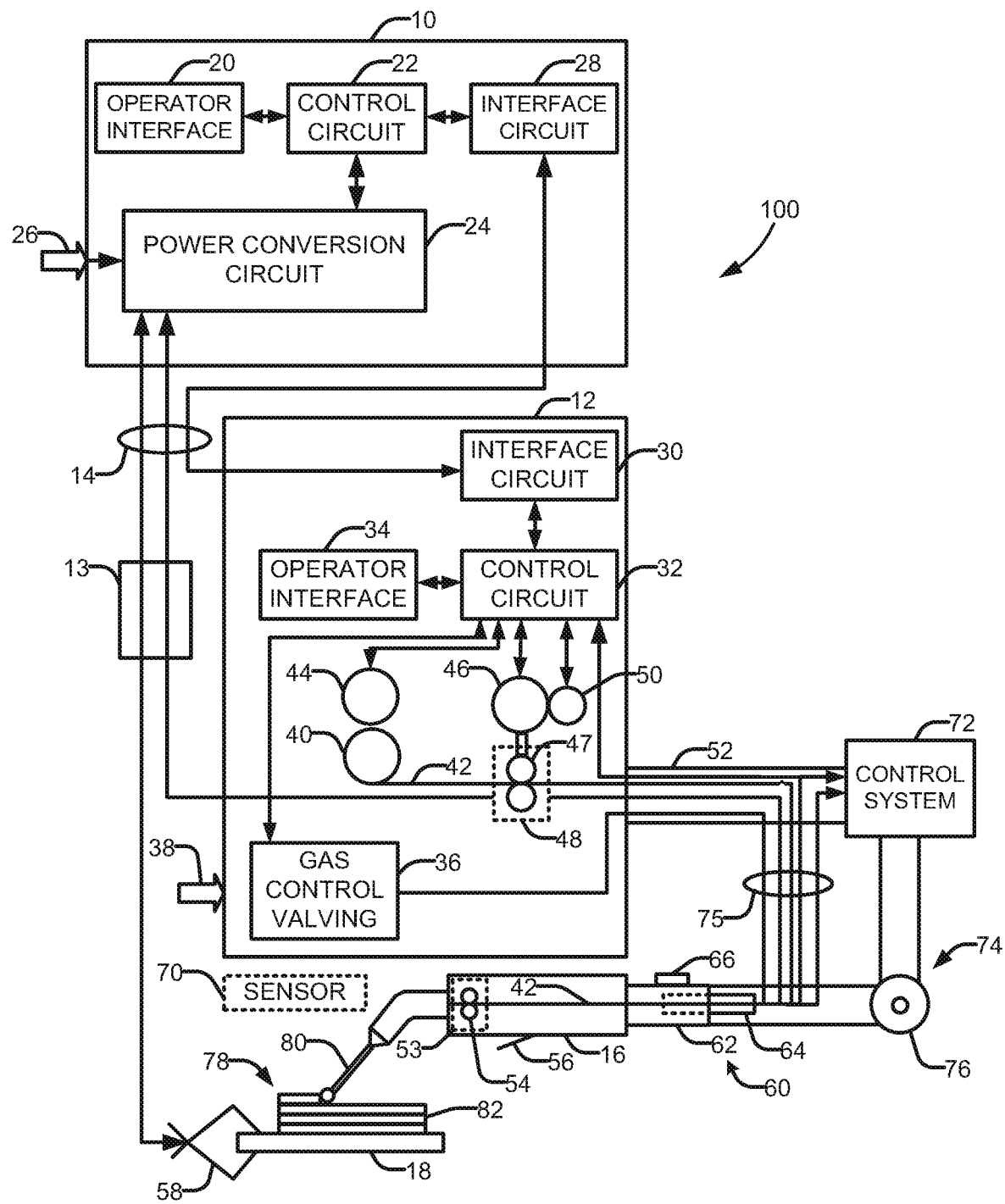
FIG. 1 illustrates an example welding-type system, in accordance with aspects of this disclosure.

Disclosed examples of a welding-type system for controlling a drive roll contact force include a power supply and a wire feeder. The wire feeder includes a control circuit, wire feed motors, drive roll, and an actuator to adjust the contact force on the welding wire. For example, one or more sensors, such as a strain gauge or an optical sensor, can provide a feedback signal to the controller or an operator that corresponds to the amount of welding wire contact force or tension from the drive rolls. Based on the feedback signal, the controller can determine the contact force on the wire, and determine if the contact force is outside a range of desired threshold contact force values. For example, if the contact force falls outside the desired range, the controller may command the actuator to adjust the contact force automatically, via a dedicated motor, a clutch, a solenoid, a piezo-electric device, and/or other electromechanical components configured to adjust the contact force on the welding wire.

The actuator may cause a change in the position of one or more of the drive rolls, such as increasing or decreasing the distance between drive rolls through which the wire is fed. Additionally or alternatively, a position of the drive roll can be adjusted to change an area on the surface of the drive roll in contact with the wire. In some examples, the controller generates an alert for an operator, indicating that the contact force has fallen outside a desired range of contact force values. The alert may include instructions as to the particular drive roll at issue, what adjustments might correct the issue, such that the operator can manually adjust the drive roll position to bring the contact force into compliance, and/or initiate an automatic sequence to correct the issue.

In disclosed examples, a wire feeder for feeding an electrode wire from a wire source in a welding system includes one or more drive rolls to advance an electrode wire by contact force, wherein a contact force on the wire from the drive rolls is adjustable. A controller receives a feedback signal corresponding to the contact force; and commands an actuator to adjust a contact force on the wire from the one or more drive rolls in response to the contact force falling outside a range of threshold contact force values.

In examples, the actuator is configured to adjust a position of the one or more drive rolls to adjust the contact force on the wire. In some examples, the actuator is one of a stepper motor, a solenoid, or a piezo-electric device. In examples, one or more sensors configured to monitor the contact force on the wire. In some examples, the one or more sensors comprises one of a strain gauge or an optical sensor. In examples, the one or more sensors is configured to generate the feedback signal based on the monitoring.

In some examples, a drive roll motor to drive the one or more drive rolls, the drive roll motor being activated by a power output from a power source. In examples, the power source configured to transmit information corresponding to the power output to the controller as the feedback signal. In some examples, the drive roll motor adjusts the contact force on the wire from the drive rolls in response to a command from the controller based on the power output.

The welding-type system comprises of a wire feeder for feeding an electrode wire from a wire source in a welding system, the wire feeder comprises one or more drive rolls to advance an electrode wire by contact force. The one or more drive rolls provide contact force through contact with the wire, and one or more interfaces to receive information from or provide information to a controller. The controller is configured to receive a feedback signal corresponding to the contact force on the wire from the one or more drive rolls. The controller compares the contact force to a range of threshold contact force values; and provides an alert via the one or more interfaces in response to the contact force falling outside the range of threshold contact force values.

In some examples, the alert is one of an optical, an audible, an olfactory response, or a haptic alert. In some examples, the one or more interfaces receive information corresponding to one of a type or a diameter of the wire. In examples, the one or more interfaces receive information from a user corresponding to an adjustment of the contact force on the wire. In some examples, the controller generates a command for an actuator to adjust contact force on the wire from the one or more drive rolls in response to the received information.

In examples, the one or more drive rolls include a first contact area and a second contact area, the first contact area to make contact with the wire when the one or more drive rolls are in a first position within the wire feeder, and the second contact area to make contact with the wire when the one or more drive rolls are in a second position within the wire feeder. In some examples, the one or more drive rolls are configured for a user to manually change a position of the one or more drive rolls such that contact between the one or more drive rolls and the wire changes from the first contact area to the second contact area.

In examples, an actuator, wherein the actuator is configured to adjust a position of one or more of the drive rolls to change contact with the wire from the first contact area to the second contact area.

The welding-type system includes a wire feeder system for feeding an electrode wire from a wire source to a welding torch along a wire path. The wire feeder system comprises a first pair of drive rolls disposed along the wire path closer to the wire source than to the welding torch; and a second pair of drive rolls disposed along the wire path closer to the welding torch than to the wire source. The wire feeder system includes one or more sensors configured to monitor a contact force on the wire from one of the first or second pairs of drive rolls; and a controller to receive a feedback signal corresponding to the contact force on the wire from one of the first or second pairs of drive rolls. The controller commands a first actuator to adjust a contact force on the wire from the first pair of drive rolls in response to the contact force at the first pair of drive rolls falling outside a first range of threshold contact force values. The controller commands a second actuator to adjust a contact force on the wire from the second pair of drive rolls in response to the contact force at the second pair of drive rolls falling outside a second range of threshold contact force values.

In some examples, the first and second actuators are configured to adjust a position of one or more of the first and second the drive rolls to adjust the contact force on the wire. In examples, the first and second actuators are one of a stepper motor, a solenoid, or a piezo-electric device.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuit and other ancillary circuit associated therewith.

As used herein, the term "pulse welding" includes welding with output power that is generally pulsed, at a controllable frequency, between a greater peak and a lesser background, and pulse welding is performed in an arc state.

As used herein, the term "periodic" and/or "cyclical" welding process and/or output includes welding output that may be characterized as a series of periods and/or cycles, wherein each cycle may be the same, similar or different.

As used herein, the term "wire feeder" includes the motor or mechanism that drives the wire, the mounting for the wire, and controls related thereto, and associated hardware and software.

As used herein, the term "bi-directional wire feeder" includes the motor or mechanism that drives the wire, the mounting for the wire, and controls related thereto, and associated hardware and software, the bi-directional wire feeder being capable of both advancing and reversing the wire. The bi-directional wire feeder can be used during a periodic and/or a cyclical welding process As used herein, the term "controller" or "control circuit" includes digital and/or analog circuit, discrete or integrated circuit, microprocessors, DSPs, FPGAs, etc., and/or software, hardware and firmware, located on one or more boards, used to control all or part of a welding-type system or a device such as a power supply, power source, engine or generator.

As used herein, a "circuit" or "circuit" includes any analog and/or digital components, power and/or control elements, such as a microprocessor, digital signal processor (DSP), software, and the like, discrete and/or integrated components, or portions and/or combinations thereof.

As used herein, the term "energy storage device" is any device that stores energy, such as, for example, a battery, a supercapacitor, etc.

As used herein, the term "memory" includes volatile and non-volatile memory, and can be arrays, databases, lists, etc.

As used herein, the term "torch" or "welding-type tool" can include a hand-held or robotic welding torch, gun, or other device used to create the welding arc.

As used herein, the term "welding mode" or "welding operation" is the type of process or output used, such as CC, CV, pulse, MIG, TIG, spray, short circuit, etc.

As used herein, the term "boost converter" is a converter used in a circuit that boosts a voltage. For example, a boost converter can be a type of step-up converter, such as a DC-to-DC power converter that steps up voltage while stepping down current from its input (e.g., from the energy storage device) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

FIG. 1 illustrates an example arc welding-type system 100 for performing controlled short circuit (CSC) welding operations. As shown in the arc welding-type system of FIG. 1, a power supply 10 and a wire feeder 12 are coupled via conductors or conduits 14. In the illustrated example, the power supply 10 is separate from the wire feeder 12, such that the wire feeder may be positioned at some distance from the power supply near a welding location. However, in some examples the wire feeder may be integrated with the power supply 10. In such cases, the conduits 14 would be internal to the system. In examples in which the wire feeder 12 is separate from the power supply 10, terminals are typically provided on the power supply and on the wire feeder 12 to allow the conductors or conduits to be coupled to the systems so as to allow for power and gas to be provided to the wire feeder 12 from the power supply 10, and to allow data to be exchanged between the two devices.

The system 100 is configured to provide wire, power and shielding gas to a welding tool or welding torch 16. The torch 16 may be of many different types, and may allow for the feed of a welding wire 42 (e.g., an electrode wire) and gas to a location adjacent to a workpiece, substrate or platform 18. A second conductor is run to the welding workpiece so as to complete an electrical circuit between the power supply and the workpiece. In the context of additive manufacturing, the substrate 18 provides a foundation upon which a part 78 that includes layers 82 is to be formed by application of metal droplets 80. The disclosed controlled short circuit welding system 100 can employ a switch 13 to provide an alternative current path for one or more welding processes.

The welding system 100 is configured for data settings to be selected by the operator and/or a welding sequence, such as via an operator interface 20 provided on the power supply 10. The operator interface 20 will typically be incorporated into a front faceplate of the power supply 10, and may allow for selection of settings such as the weld process, the type of wire to be used, voltage and current settings, and so forth. In particular, the system is configured to allow for welding with various steels, aluminums, or other welding wire that is channeled through the torch 16. Further, the system is configured to employ welding wires with a variety of cross-sectional geometries (e.g., circular, substantially flat, triangular, etc.). These weld settings are communicated to a control circuit 22 within the power supply. The system may be particularly adapted to implement welding regimes configured for certain electrode types.

Process instructions for the welding process can be provided via a weld sequence program, such as stored on a memory accessible to a processor/control circuit 22 associated with the power supply 10. In such a case, the sequencer can employ stored information (e.g., associated with a desired product configuration and/or process, including historical data), and/or customizable by a user. For instance, information associated with a particular design (e.g., thermal profiles associated with the part 78, material characteristics, system control parameters, etc.) corresponding to the part 78 can be stored in a memory and/or provided via a network interface. Thus, the information can be used to control operation of the system to facilitate formation of the part 78, such as by controlling a power output from the power supply 10, wire feeder motors 48, 54, etc.

The control circuit 22 operates to control generation of welding power output that is supplied to the welding wire 42 for carrying out the desired welding operation. In examples, the control circuit 22 may be adapted to regulate a pulsed MIG welding regime that promotes short circuit transfer of molten metal to the part 78, without adding excessive energy to the part 78 or the welding wire 42. In "short circuit" modes, droplets of molten material form on the welding wire 42 under the influence of heating by the welding arc, and these are periodically transferred to the part 78 by contact or short circuits between the welding wire 42 and droplets 80 and the part 78. Note that herein in this disclosure part 78 is sometimes referred to as workpiece, weldment or welding workpiece.

In this manner, the system and/or the control circuit 22 controls the welding of the part 78 by adjusting one or more welding process parameters of the system during the welding process. The welding process parameters may include, but are not limited to, wire feeder speed, wire feeder direction, travel speed, power output, process mode, deposition path, deposition sequence, torch angle, etc.

Additionally, a sensor(s) 70 can measure operational parameters associated with operation of the system (e.g., current, voltage, inductance, phase, impedance, power, inductance, speed, acceleration, orientation, position, etc.). The sensed operational characteristic (e.g., voltage, current, temperature, shape, speed, etc.) can be provided to the control circuit 22 or other controller (e.g., control circuit 32, a controller associated with the control system 72, etc.) to further control the welding process.

Power from the power supply is applied to the wire electrode 42, typically by a welding cable 52. Similarly, shielding gas is fed through the wire feeder and the welding cable 52. During welding operations, the welding wire 42 is advanced through a jacket of the welding cable 52 towards the torch 16. Within the torch 16, a second wire feeder motor 53 comprises rollers 54 may be provided with an associated drive roll, which can be regulated to provide the desired wire feed speed and/or direction.

A control system 72 can be employed to regulate, for example, movement and position of the torch 16 in accordance with the control circuits 22, 32, as well as information from sensor(s) 70. In examples, the control system 72 may be in communication with the power supply 10, the wire feeder 12 and/or the torch 16 via one or more cables 75. Thus, power and/or information can be provided and/or exchanged via cable 75 to control the welding process. In particular, the control system 72 can employ one or more arms 74 having one or more actuators 76 (e.g., servo motors, joints, etc.). In this way, the control system 72 can command fine control of the attached torch 16 in six degrees of freedom during the welding operation, including travel speed, tool location, distance from the part 78, etc. The control system 72 may include one or more sensors to sense welding process parameters, which can be communicated with the control circuits 22, 32 to further facilitate formation of the part 78.

In some examples, the control circuits 22, 32 may provide a signal to the wire feeder 12, the power supply 10, and or the control system 72 to enable the welding process to be started and stopped in accordance with a particular application or welding process. That is, upon initiation of the process, gas flow may begin, wire may advance, and power may be applied to the welding cable 52 and through the torch 16 to the advancing welding wire 42. A workpiece cable and clamp 58 allow for closing an electrical circuit from the power supply through the welding torch, the electrode (wire), and the part 78 for maintaining the welding arc during the operation.

The present arc welding system allows for control of successive voltage and/or current levels and/or pulse durations based on previous current and duration measurements so as to control the promotion, occurrence, duration, and interruption of short circuit events between the welding wire electrode and the advancing weld puddle. In particular, current waveforms can be regulated based on one or more preceding short circuit events, or aspects of the short circuit events, such as its duration.

The control circuit 22 is coupled to power conversion circuit 24. This power conversion circuit 24 is adapted to create the output power, such as pulsed waveforms applied to the welding wire 42 at the torch 16. Various power conversion circuits may be employed, including choppers, boost circuit, buck circuit, inverters, converters, and so forth. The configuration of such circuit may be of types generally known in the art in and of itself. The power conversion circuit 24 is coupled to a source of electrical power as indicated by arrow 26. The power applied to the power conversion circuit 24 may originate in the power grid, although other sources of power may also be used, such as power generated by an engine-driven generator, batteries, fuel cells or other alternative sources. The power supply illustrated in FIG. 1 may also include an interface circuit 28 configured to allow the control circuit 22 to exchange signals with the wire feeder 12.

The wire feeder 12 may include a complimentary interface circuit 30 that is coupled to the interface circuit 28. In some examples, multi-pin interfaces may be provided on both components and a multi-conductor cable run between the interface circuit to allow for such information as wire feed speeds, processes, selected currents, voltages or power levels, and so forth to be set on either the power supply 10, the wire feeder 12, or both.

The wire feeder 12 also may include control circuit 32 coupled to the interface circuit 30. As described below, the control circuit 32 allows for wire feed speeds to be controlled in accordance with operator selections or stored sequence instructions, and permits these settings to be fed back to the power supply via the interface circuit. The control circuit 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuit 32 may also be coupled to gas control valving 36 that regulates the flow of shielding gas to the torch. In general, such gas is provided at the time of welding, and may be turned on immediately preceding the weld and for a short time following the weld. The gas applied to the gas control valving 36 may be provided in the form of pressurized bottles, as represented by reference numeral 38.

The wire feeder 12 includes components for feeding wire to the welding torch 16 and thereby to the welding application, under the control of control circuit 32. For example, one or more spools of welding wire 40 are housed in the wire feeder. Welding wire 42 is unspooled from the spools and is progressively fed to the torch 16. The spool may be associated with a clutch 44 that disengages the spool when wire is to be fed to the tool. The clutch 44 may also be regulated to maintain a minimum friction level to avoid free spinning of the spool 40. The first wire feeder motor 46 may be provided within a housing 48 that engages with wire feed rollers 47 to push wire from the wire feeder 12 towards the torch 16.

In the example of FIG. 1, a moveable buffer 60 can include a first portion 62 and a second portion 64, where at least one of the first and second portions are configured to move relative the other portion in response to a change in the amount of welding wire 42 between a first wire feeder motor 46 and a second wire feeder motor 53. A sensor 66 (e.g., one or more sensors) is configured to sense relative movement or displacement between the first and second portions and provide sensor data to control circuit (e.g., control circuit 22, 32) to adjust a speed and/or direction of the welding wire 42 in response.

In practice, at least one of the rollers 47 is mechanically coupled to the motor and is rotated by the motor to drive the wire from the wire feeder, while the mating roller is biased towards the wire to maintain good contact between the two rollers and the wire. Some systems may include multiple rollers of this type. A tachometer 50 or other sensor may be provided for detecting the speed of the first wire feeder motor 46, the rollers 47, or any other associated component so as to provide an indication of the actual wire feed speed. Signals from the tachometer are fed back to the control circuit 32, such as for continued or periodic monitoring, calibration, etc. In some examples, the system includes a wire spool motor for rotating the wire-feeding device, which can be similarly adjusted to increase or decrease the amount of wire between wire feeder motors.

In some examples, the wire feeder 12 can be configured to reverse the direction of the welding wire 42 (i.e. a bi-directional wire feeder). Moreover, although described as operating with two wire feeders and/or wire feeder motors (e.g., wire feeder motors 46 and 53), the system can operate with a single wire feeding unit to advance and/or reverse wire during welding operations (e.g., formation of a part 78). Additionally, or alternatively, in some examples, one wire feeder may be configured to advance the wire 42 while another wire feeder is configured to reverse the direction of the wire. In this example, one or more control circuit (e.g., control circuits 22, 32) coordinates operation of the two wire feeders to implement a controlled short circuit welding process in a welding system, as disclosed herein.

In disclosed examples, the control circuit (e.g., control circuits 22, 32) receives a feedback signal corresponding to a contact force on the wire 42 from one or more drive rolls 47, 54. The control circuit then commands an actuator and/or mechanical device to adjust the contact force in response to the contact force falling outside a range of threshold contact force values. For instance, the control circuit (e.g., control circuits 22, 32) may command the actuator to adjust the contact force automatically, via a motor (e.g., motor 46), or an associated clutch, solenoid, piezo-electric device, and/or other electromechanical. The result is an adjustment in the contact force on the welding wire 42 from the one or more drive rolls 47, 54. For example, the actuator and/or mechanical device may cause a change in the position of the drive rolls, such as increasing or decreasing the distance between drive rolls through which the wire is fed. Additionally or alternatively, a position of the drive roll can be adjusted to change an area on the surface of the drive roll in contact with the wire.

Other system arrangements and input schemes may also be implemented. For example, the welding wire may be fed from a bulk storage container (e.g., a drum) or from one or more spools outside of the wire feeder. Similarly, the wire may be fed from a "spool gun," in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

Although described with respect to an arc welding-type system, the disclosed system may be implemented in conjunction with a variety of technologies to conduct various types of welding processes.

Thus, as described with respect to FIG. 1, the welding-type system 100 can include a welding-type power source 10 configured to generate output power for an arc welding process, for example, to power one or more of the wire feeder 12, the robotic system 74, perform arc welding via torch 16, etc. The wire feeder 12 may be a bi-directional wire feeder configured to advance or retract the wire 42 to or from the workpiece 18. Sensors 70 measure one or more welding process parameters, and provide such measurements to a controller (e.g., control circuit 22, control circuit 32, control system 72, etc.), which commands operation of the, for instance, in response to one or more welding process parameters exceeding one or more threshold values corresponding to a short clearance event during a welding/additive manufacturing operation.

Figure 2:
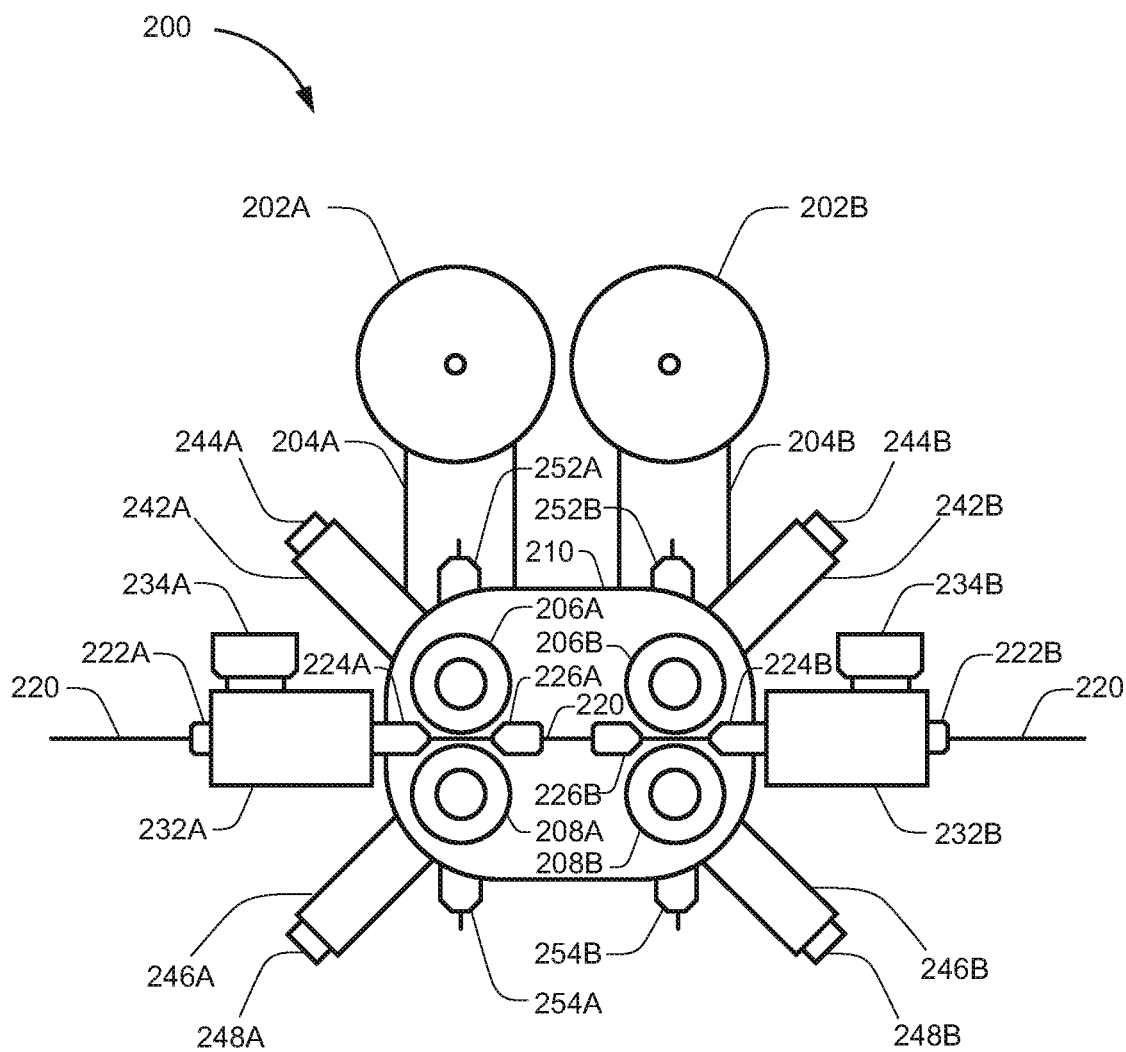
FIG. 2 illustrates an example drive roll system of a wire feeder, in accordance with aspects of this disclosure.

FIG. 2 illustrates a drive roll system 200 of a wire feeder, in accordance with aspects of this disclosure. The drive roll system 200 of the wire feeder, for example the wire feeder 12 depicted in FIG. 1, includes one or more motors 202A and 202B. The motors 202A and 202B transfer power to one or more of drive rolls 206A, 206B, 208A and 208B. The power from motors 202A and 202B is transferred to one or more of the drive rolls 206A, 206B, 208A and 208B via the power transfer systems 204A and 204B. The power transfer systems 204A and 204B may include one or more clutches (not shown), gear systems (not shown) or belt systems (not shown). For example, a gear can be attached to a tensioning type device to adjust the position of the drive rolls. Upon a command from the controller, the gear can engage with a motor (e.g., wire feeder motor 46) to change the position of the drive roll and thus the contact force on the wire. The drive rolls 206A, 206B, 208A and 208B may be located inside a drive roll housing 210.

Wire 220 is fed into and out of the drive roll housing 210 via wire feedthrough ferrules 224A and 224B respectively. Inside the drive roll housing 210 the wire 220 is guided via wire feedthrough ferrules 226A and 226B. The wire 220 passes between the drive rolls 206A and 208A and is contact with one or both of these drive rolls 206A and 208A. The wire 220 also passes between the drive rolls 206B and 208B and is in contact with one or both of these drive rolls 206B and 208B.

The wire 200 moves in the forward direction or backward direction via the forward rotations or backward rotations of the drive rolls 206A, 206B, 208A and 208B. This forward and backward direction is described in more detail further below in the sections associated with FIGS. 4 and 5.

Outside the drive roll housing 210, the wire 220 passes through a tension control and gripper systems 232A and 232B. The contact force control and gripper systems 232A and 232B can be used to manually and/or automatically adjust the contact force between the drive rolls and the wire 220. The contact force control and gripper systems 232A and 232B may include manual adjustment screws 234A and 234B.

The drive roll system 200 may also include one or more actuators 242A, 242B, 246A and 246B. These actuators 242A, 242B, 246A and 246B may be configured to adjust the position of the one or more drive rolls 206A, 206B, 208A and 208B in order to adjust the contact force on the wire 220 that is applied by the drive rolls 206A, 206B, 208A and 208B. The actuators 242A, 242B, 248A and 248B may be a stepper motor, a solenoid, a piezo-electric drive type actuator or other types of suitable actuators. The drive roll housing 210 may be equipped with one or multiple actuators. In the exemplary drive roll system of FIG. 2, the drive roll housing 210 is equipped with four actuators 242A, 242B, 246A and 246B. The actuators 242A, 242B, 246A and 246B may be manually adjusted actuators or automatically adjusted actuators. In some examples, the actuators may be automatically adjusted, for instance, via commands from a controller in response to information from one or more sensors. Additionally or alternatively, manual setting adjusters may be used, such as adjusters 244A, 244B, 248A and 248B that are depicted in FIG. 2.

The exemplary drive roll system 200 of FIG. 2 shows two contact force control and gripper systems 232A and 232B. The exemplary contact force and gripper systems 232A and 232B depicted in FIG. 2 can be equipped with manual adjustment screws 234A and 234B. However, it is possible that the contact force control and gripper systems 232A and 232B are equipped, in other embodiments, with actuators instead of manual screws 234A and 234B for automatic adjustment.

The drive roll system 200 may also include one or more sensors 252A, 252B, 254A and 254B. The sensors 252A, 252B, 254A and 254B may be installed on the driver roll housing 210 or may be installed remotely and/or on another location of the driver roll system 200. The sensors 252A, 252B, 254A and 254B may be used to monitor one or more parameters associated with the contact force on the wire 220 that is applied by the drive rolls 206A, 206B, 208A and 208B. The sensors 252A, 252B, 254A and 254B may be, for example, a strain gauge, optical sensor, or another suitable sensor.

The sensors 252A, 252B, 254A and 254B may be configured to generate feedback signals based on their monitoring function and to transmit the feedback signal to a controller (e.g., controller 32 of FIG. 1). For example, the feedback signal may be associated with one or more welding process parameters, such as current to drive the motor, wire feed speed, a temperature, impedance, a change one or more parameter values, and/or a combination of any two or more values. Based on one or more parameter values, the controller is configured to determine the amount of contact force on the wire 220 via processing on control circuit 22, 32, by calculation and/or by comparing the values to a list with a range of threshold values associating welding process parameters to contact force values. For example, the list may be stored on a storage medium (i.e. within control circuit 22, 32) and/or be accessed remotely (e.g. via interface circuit 28, 30). The list associates welding process parameters with wire types, welding processes, as well as commanded and/or historical values for proper contact force application. Additionally or alternatively, a user may input information into the system 100 (e.g., via operator interface 20, 34).

Thus, the controller is configured to receive feedback signals corresponding to the contact force on the wire 220 and compare the contact force to a range of threshold contact force values. If the contact force falls outside the range of threshold values, the controller may automatically command an actuator to adjust a position of one or more drive rolls to adjust the contact force. In some examples, the controller may provide an alert via one or more interfaces 28, 30 in response to the contact force falling outside the range of threshold contact force values.

Although described with respect to wire feeder 12, the principles of operation for controlling the contact force on the wire from the drive rolls is equally applicable to a variety of wire feeders, such as wire feeder 53. Further, wire feeders may include fewer than four drive rolls or more than four drive rolls. And while described as a pair of two opposing drive rolls driving the wire in the contact area between as each drive roll driven by a motor, in some examples, only one drive roll in a pair is driven by a motor and the other drive roll turns in response to a contact force from the driven drive roll.

Figure 3:
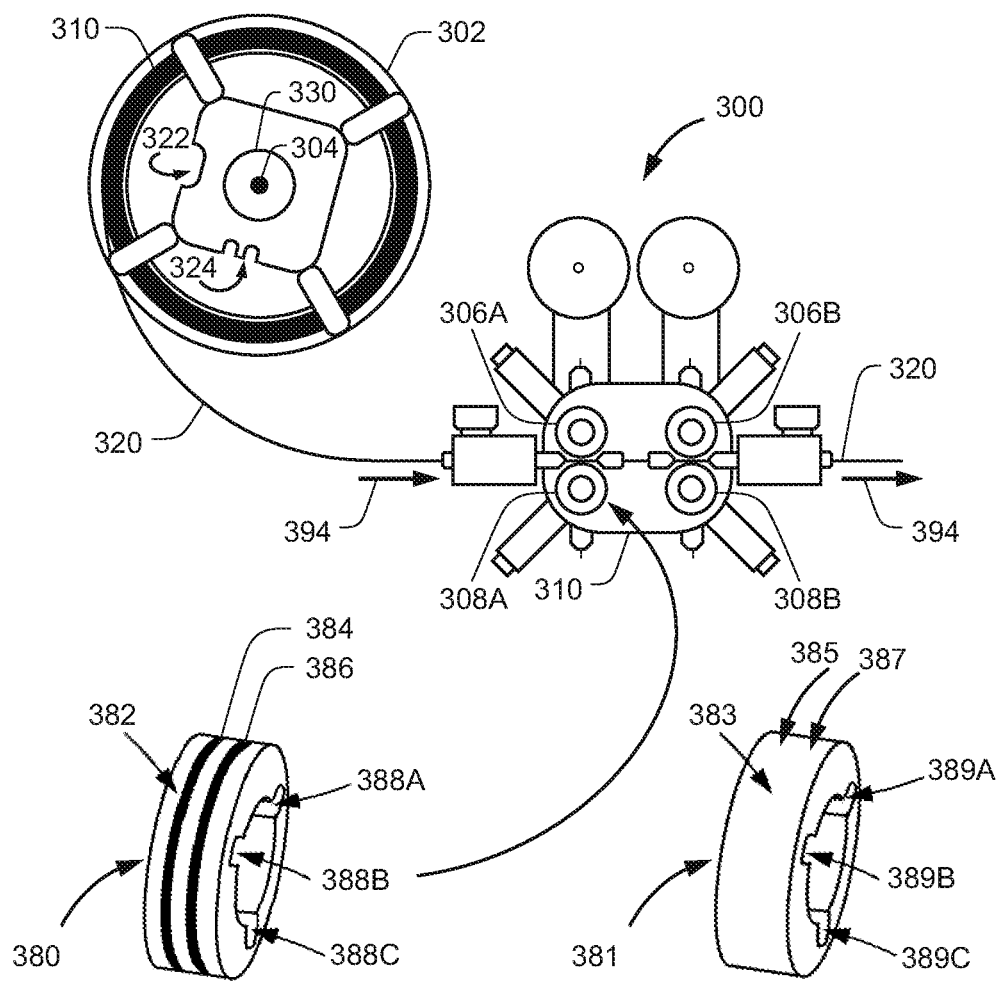
FIG. 3 illustrates another example view of the drive roll system of the wire feeder of FIG. 2, in accordance with aspects of this disclosure.

FIG. 3 illustrates a drive roll system 300 of a wire feeder, a wire spool wheel 302 and individual drive rolls 306A, 306B, 308A and 308B, in accordance with aspects of this disclosure. The driver roll system 300 may be configured to receive wire 320 from the wire spool wheel 302. The wire spool wheel 302 may include a spool of wire 310 that rotates around a pivot point 304 and may be held in place by a wheel holder 330. In some examples, a position of the wheel holder 330 may be adjustable in order to adjust the contact force applied onto the wire spool wheel 302. The wheel holder 330 may also be loosened and removed so that the wire spool wheel 302 can be unmounted, flipped and reinstalled again in a different position. There may appear notches or markings 322 or 324 on the wire spool wheel 302 so that the specific mounting position of the wire spool wheel 302 is clearly identifiable to an operator or user.

In the FIG. 3, the wire 320 is shown moving in as indicated by arrows 394. The direction of the motion of the wire 320 is defined as moving away from the wire spool wheel 302 and towards the welding torch (not shown in FIG. 3). A backward direction of the motion of the wire 320 is defined as moving away from the welding torch (not shown in FIG. 3) and towards the wire spool wheel 302.

Figure 4:
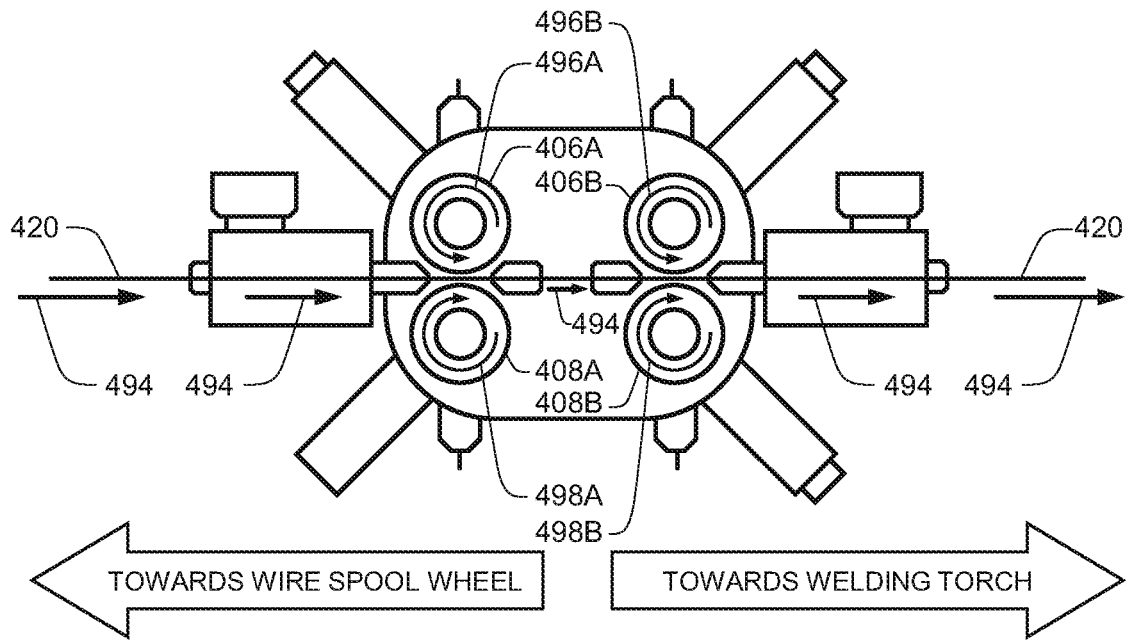
FIGS. 4 and 5 illustrate example operations of the drive roll system of the wire feeder of FIG. 2, in accordance with aspects of this disclosure.

FIG. 4 illustrates the forward direction of motion of the wire 420 (indicated by the arrows 494) as the rollers 406A, 406B, 408A and 408B rotate. In FIG. 4, the rollers 406A, 406B, 408A and 408B are depicted rotating in the directions indicated by the arrows 496A, 496B, 498A and 498B respectively.

Figure 5:
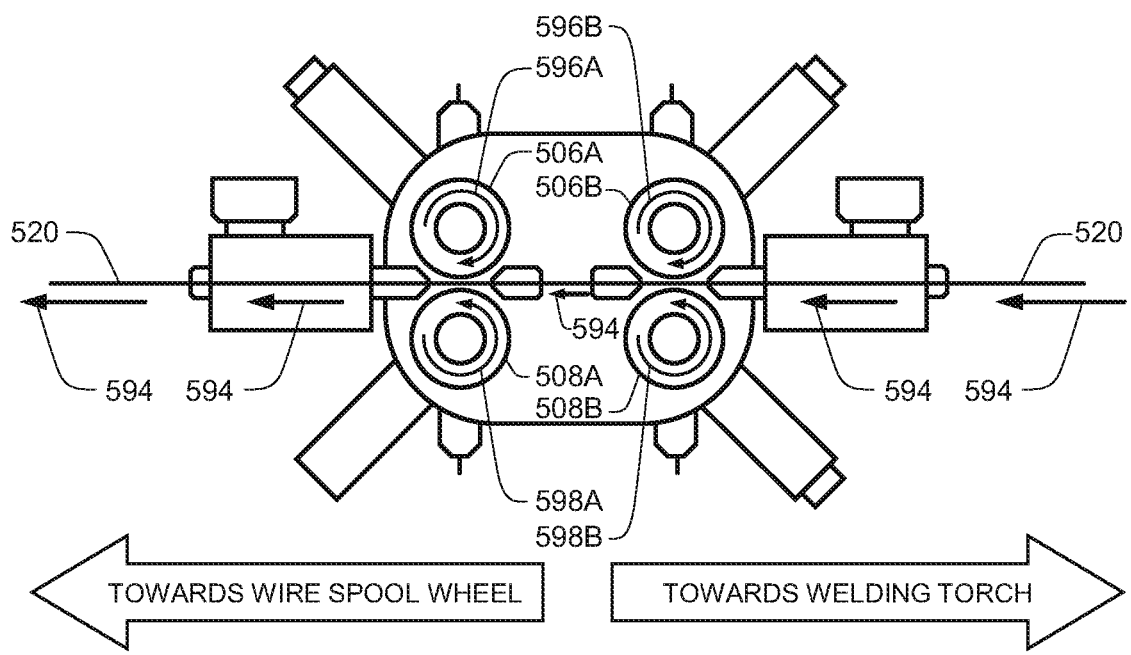

FIG. 5 illustrates the backward direction of motion of the wire 520 (indicated by the arrows 594) as the rollers 506A, 506B, 508A and 508B rotate. In FIG. 5, the rollers 506A, 506B, 508A and 508B are depicted rotating in the directions indicated by the arrows 596A, 596B, 598A and 598B respectively.

Referring back to FIG. 3, the drive rolls 306A, 306B, 308A and 308B apply a contact force onto the wire 320 that passes between the drive rolls 306A and 308A and also passes between the driver rolls 306B and 308B.

Two different exemplary drive rolls 380 and 381 (e.g., drive rolls 306A, 306B, 308A and 308B) are depicted in FIG. 3, represented two possible examples of drive roll types among others. As shown, the wire 320 comes into contact with the drive rolls 380 and 381 at the surfaces 382 and 383, respectively. Note that the drive rolls 306A, 306B, 308A and 308B may have one or more grooves, shown by grooves 384 and 386 on surface 382 of drive roll 380. The wire 320 may come into contact with the drive roll 380 in one of the grooves 384 or 386 as determined by the specific position of the drive roll 380 in the drive roll system 300. The grooves 384 and 386 may have various shapes for example, a U-shape, V-shape, a square shape, etc. As described previously, the amount of contact force applied by the drive rolls 306A, 306B, 308A and 308B onto the wire 320 is related to a position of the drive roll relative an opposing drive roll and/or the wire 320. In some examples, the position may be adjusted by use of actuators and/or contact force control and gripper systems activated in response to a command from the controller.

The drive rolls 306A, 306B, 308A and 308B may have a flat surface 383 as shown with respect to drive roll 381 (i.e. free of grooves). However, the wire 320 may come into contact with the surface 383, aligned with a first surface area indicated by arrow 385, or alternatively at a second surface area indicated by arrow 387. Which surface area is in contact with the wire 320 is determined by the specific orientation and/or position (i.e. a lateral position) of the drive roll 381 with respect to the drive roll system 300.

In order to minimize wear and tear on the drive rolls 306A, 306B, 308A and 308B (e.g., drive rolls 380 and 381), an operator may uninstall the drive rolls 306A, 306B, 308A and 308B from the drive roll system 300, flip the drive rolls 306A, 306B, 308A and 308B around 180 degrees, and reinstall the drive rolls 306A, 306B, 308A and 308B onto the drive roll system 300. In this manner, the wire 320 may no longer be in contact with the surface 385 of the drive roll 381 (or the groove 384 of the drive roll 380) and may instead be in contact with the surface 387 of the drive roll 381 (or the groove 386 of the driver roll 380).

In some examples, the drive roll 380 may include notches 388A, 388B and 388C which may be used to mount the drive roll 380 onto an axle in the drive roll system 300 of the wire feeder. Similarly, drive roll 318 may include notches 389A, 389B and 389C, which may be used to mount the drive roll 381 onto an axle in the drive roll system 300 of the wire feeder.

In additional or alternative examples, the drive rolls are not removed, rotated and replaced in a different orientation. Rather, a position of the drive rolls is adjusted relative to the wire feeder housing 310. In this example, in response to a determination that the contact force is to be adjusted, the controller commands an actuator and/or a motor to shift one or more drive rolls. The change in position can be relative to the opposing drive roll (e.g., increasing or reducing the distance between the two) and/or shifting toward or away from the housing 310 (e.g., changing alignment of the wire 320 from groove 384 to 386 in drive roll 380, or from first surface area 385 to second surface area 387 of drive roll 381). The type and amount of adjustment can be determined by operational information, such as how much use a particular surface has endured, the type of wire, the desired wire feed speed, among other parameters.

As shown in FIG. 3, the wire feeder system 300 a first pair of drive rolls (306A and 308A) disposed along the wire path closer to the wire source 302 than to the welding torch; and a second pair of drive rolls (306B and 308B), the first and second pair of drive rolls working together to advance and/or retract the welding wire 320.

In some examples, a first pair of drive rolls can be associated with a first wire feeder (e.g., primary wire feeder 12 of FIG. 1), whereas a second pair of drive rolls is associated with a second wire feeder (e.g., an assist wire feeder, comprising wire feeder motor 53 and drive rolls 54 of FIG. 1). In this example, one or more controllers (e.g., control circuit 32 of FIG. 1) command a first actuator to adjust a contact force on the wire from the first pair of drive rolls (e.g., drive rolls 47 of FIG. 1) in response to the contact force falling outside a first range of threshold contact force values. One or more controllers (e.g., control circuit 32 of FIG. 1) command a second actuator to adjust a contact force on the wire in response to the contact force at the second pair of drive rolls (e.g., drive rolls 54 of FIG. 1) falling outside a second range of threshold contact force values. Thus, in a controlled short circuit welding operation, as disclosed herein, each wire feeder is therefore provided with individual control over the contact force at respective drive rolls.

Figure 6:
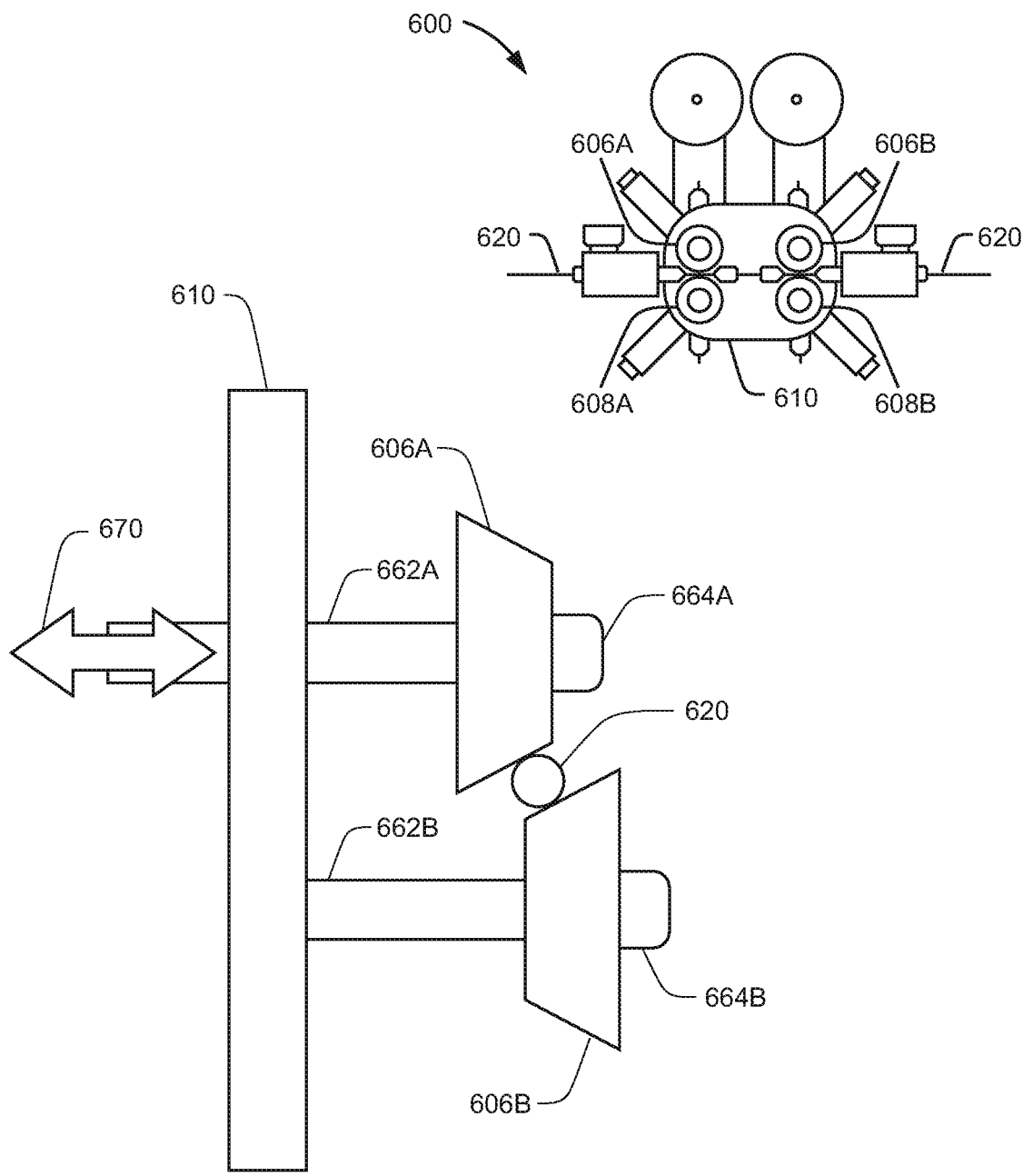
FIG. 6 illustrates another example drive roll system of a wire feeder, in accordance with aspects of this disclosure.

FIG. 6 illustrates another drive roll system 600 of a wire feeder, in accordance with aspects of this disclosure. In this example, drive rolls 606A, 606B, 606C, 606D are attached to wire feeder housing 610 via one or more adjustable drive roll mounting axles 662A, 662B, and rotate to move wire 620. The drive rolls can be removed and replaced, such as by a fastener 664A, 664B. One or more of the drive rolls 606A, 606B, 608A, 608B can have a generally conical or frustoconical shape, such that a space occupied by the wire 620 is angled with respect to the wire feeder housing 610. Movement of an adjustable drive roll mounting axle 662A can move drive roll 606A toward or away from the wire feeder housing 610, indicated by arrow 670, to adjust the space, for instance, thereby adjusting the contact force on the wire 620. In some examples, the drive roll 606B can freely rotate on fixed axle 662B in response to a force from the driver roll 606A. In some examples, the drive roll 606B is driven by a motor as well.

In some examples, both the drive rolls 606A and 606B are moveable, which can be used to adjust the surface on the drive roll on which the wire makes contact. For instance, if a position of both drive rolls 606A and 606B is moved away from the wire feeder housing 610, the wire 620 shifts toward the base of the drive roll 606A and the tip of the drive roll 606B. Conversely, if a position of both drive rolls is moved toward the wire feeder housing, the wire shifts toward the tip of the drive roll 606A and the base of the drive roll 606B.

Figure 7:
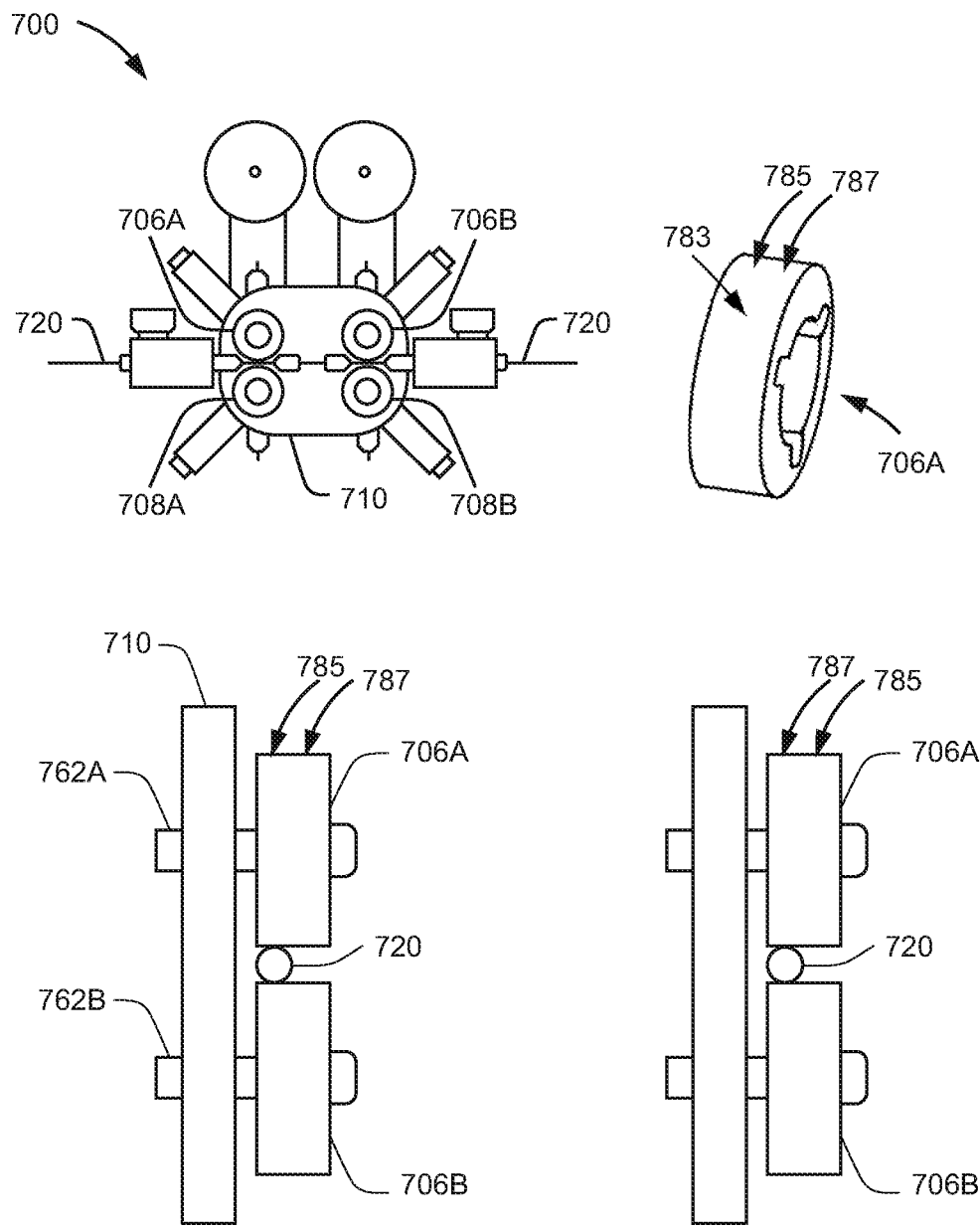
FIG. 7 illustrates yet another drive roll system of a wire feeder, in accordance with aspects of this disclosure.

FIG. 7 illustrates another drive roll system 700 of a wire feeder, in accordance with aspects of this disclosure. In this example, drive rolls 706A, 706B, 708A, 708B are attached to wire feeder housing 710 via one or more adjustable drive roll mounting axles 762A, 762B, and rotate to move wire 720. The drive rolls can be removed and replaced, as disclosed herein.

The drive rolls 706A, 706B, 708A, 708B may have a flat surface 783 as shown with respect to drive roll 706A. However, the wire 720 may come into contact with the surface 783, aligned with a first surface area indicated by arrow 785, or alternatively at a second surface area indicated by arrow 787. Which surface area is in contact with the wire 720 is determined by the specific orientation and/or position (i.e. a lateral position) of the drive roll 706A with respect to the drive roll housing 710.

As shown in the example of FIG. 7, in order to minimize wear and tear on the drive rolls, an operator may uninstall the drive roll 706A from axle 762A, flip the drive rolls 706A around 180 degrees, and reinstall the drive rolls 706A onto the drive roll system 700. In this manner, the wire 720 may no longer be in contact with the surface 785 of the drive roll 706A and may instead be in contact with the surface 787.

In some examples, one or more of axles 762A and 762B are adjustable with respect to wire feeder housing 710. For instance, the drive roll 706A can be repositioned further from the drive roll housing 710, such that drive roll 706A is no longer aligned with drive roll 706B.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A wire feeder for feeding an electrode wire from a wire source in a welding system, the wire feeder comprising:
   a motor;
   one or more drive rolls driven by the motor to advance an electrode wire by contact force, wherein the one or more drive rolls provide contact force through contact with the wire, and wherein a first drive roll of the one or more drive rolls includes a first contact area and a second contact area, the first contact area to make contact with the wire when the first drive roll is in a first position within the wire feeder, and the second contact area to make contact with the wire when the first drive roll is in a second position within the wire feeder; and
   one or more interfaces to receive information from or provide information to a controller, the controller to:
      receive a feedback signal corresponding to the contact force on the wire from the one or more drive rolls based on a position of the one or more drive rolls;
      compare the contact force to a range of threshold contact force values; and
      provide an alert via the one or more interfaces in response to the contact force falling outside the range of threshold contact force values.

2. The wire feeder of claim 1, wherein the alert is one of an optical, and audible, or a haptic alert.

3. The wire feeder of claim 1, wherein the one or more interfaces receive information corresponding to one of a type or a diameter of the wire.

4. The wire feeder of claim 1, wherein the one or more interfaces receive information from a user corresponding to an adjustment of the contact force on the wire.

5. The wire feeder of claim 4, further comprising an actuator to increase or decrease a distance between the one or more drive rolls through which the wire is fed, wherein the controller generates a command for the actuator to adjust contact force on the wire from the one or more drive rolls in response to the received information.

6. The wire feeder of claim 1, wherein the first drive roll is configured for a user to manually change the position of the first drive roll such that contact between the first drive roll and the wire changes from the first contact area to the second contact area.

7. The wire feeder of claim 1, further comprising an actuator, wherein the actuator is configured to adjust the position of the first drive roll to change contact with the wire from the first contact area to the second contact area.

8. A wire feeder system for feeding an electrode wire from a wire source to a welding torch along a wire path, the system comprising:
    a motor;
    a first pair of drive rolls driven by the motor are disposed along the wire path closer to the wire source than to the welding torch, wherein the wire is driven between first and second drive rolls of the first pair of drive rolls;
    a second pair of drive rolls disposed along the wire path closer to the welding torch than to the wire source, wherein the wire is driven between drive rolls of the second pair of drive rolls;
    one or more sensors configured to monitor a contact force on the wire from the drive rolls of one of the first or second pairs of drive rolls; and
    a controller to:
        receive a feedback signal corresponding to the contact force on the wire from the first and second drive rolls of one of the first or second pairs of drive rolls;
        command a first actuator to change a position of the first drive roll of the first pair of drive rolls relative to the second drive roll of the first pair of drive rolls to adjust a contact force on the wire from the first pair of drive rolls in response to the contact force at the first pair of drive rolls falling outside a first range of threshold contact force values; and
        command a second actuator to adjust a contact force on the wire from the second pair of drive rolls in response to the contact force at the second pair of drive rolls falling outside a second range of threshold contact force values.

9. The wire feeder of claim 8, wherein the first and second actuators are configured to adjust a position of one or more of the first and second pair of drive rolls to increase or decrease a distance between drive rolls through which the wire is fed and to adjust the contact force on the wire.

10. The wire feeder of claim 8, wherein the first and second actuators are one of a stepper motor, a solenoid, or a piezo-electric device.

11. The wire feeder of claim 8, wherein the one or more sensors comprises one of a strain gauge or an optical sensor.

12. The wire feeder of claim 11, wherein the one or more sensors is configured to generate the feedback signal based on the monitoring.

13. The wire feeder of claim 8, wherein the first actuator moves a position of the first drive roll from a first position to a second position.

14. The wire feeder of claim 8, further comprising a housing, wherein the first actuator is configured to adjust a position of the first drive roll relative to the housing to adjust the contact force on the wire.

15. The wire feeder of claim 8, wherein the motor is activated by a power output from a power source.

16. The wire feeder of claim 15, wherein the power source is configured to transmit information corresponding to the power output to the controller as the feedback signal.

17. The wire feeder of claim 16, wherein the controller is further configured to command the actuator to adjust the contact force on the wire from the first and second drive rolls based on the power output.

* * * * *